(12) United States Patent
Unno et al.

(10) Patent No.: US 9,097,343 B2
(45) Date of Patent: Aug. 4, 2015

(54) CONTROLLER OF CONTINUOUSLY VARIABLE TRANSMISSION AND VEHICLE PROVIDED WITH THE SAME

(75) Inventors: Toshio Unno, Shizuoka (JP); Kazutoshi Ishioka, Shizuoka (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 2034 days.

(21) Appl. No.: 11/487,598

(22) Filed: Jul. 14, 2006

(65) Prior Publication Data

US 2007/0027602 A1 Feb. 1, 2007

(30) Foreign Application Priority Data

Jul. 15, 2005 (JP) .................................. 2005-206990
Jun. 12, 2006 (JP) .................................. 2006-162362

(51) Int. Cl.
*G06F 17/00* (2006.01)
*F16H 61/662* (2006.01)

(52) U.S. Cl.
CPC .... *F16H 61/66254* (2013.01); *F16H 61/66259* (2013.01)

(58) Field of Classification Search
CPC .............. F16H 61/66; F16H 61/66259; F16H 61/66254; F16H 2061/6603; F16H 2061/6601; F16H 2061/66204; F16H 2061/66213; F16H 2061/66209; F16H 2061/66218; B60K 6/543
USPC ......................................................... 701/51
See application file for complete search history.

(56) References Cited

U.S. PATENT DOCUMENTS

| | | | | | |
|---|---|---|---|---|---|
| 4,627,311 | A | * | 12/1986 | Yokooku et al. ................ | 477/32 |
| 4,649,488 | A | * | 3/1987 | Osanai et al. ................... | 701/60 |
| 4,743,223 | A | * | 5/1988 | Tokoro et al. .................. | 474/69 |
| 4,764,155 | A | * | 8/1988 | Kumura et al. ................. | 474/12 |
| 4,867,732 | A | * | 9/1989 | Soga et al. ...................... | 474/28 |
| 5,001,900 | A | * | 3/1991 | Sasajima et al. ............... | 60/327 |
| 5,131,297 | A | * | 7/1992 | Yamashita et al. ............. | 477/49 |
| 5,305,662 | A | * | 4/1994 | Togai et al. .................... | 477/43 |
| 5,406,793 | A | * | 4/1995 | Maruyama et al. ............. | 60/431 |
| 5,611,748 | A | * | 3/1997 | Kashiwabara .................. | 477/47 |

(Continued)

FOREIGN PATENT DOCUMENTS

| | | |
|---|---|---|
| DE | 3201440 | 9/1983 |
| DE | 19600915 | 7/1996 |

(Continued)

*Primary Examiner* — John Q Nguyen
*Assistant Examiner* — Kyung Kim
(74) *Attorney, Agent, or Firm* — Rabin & Berdo, P.C.

(57) ABSTRACT

A speed change ratio controller, which controls a speed change ratio of the continuously variable transmission, normally exercises map control according to a predetermined speed change ratio map so that a V-N characteristic curve prescribed by a vehicle speed (V) and an engine rotational frequency (N) falls in a range of a predetermined region of speed change. When an accelerator opening degree exceeds a predetermined range and a vehicle load exceeds a predetermined range a target speed change ratio is corrected so that the V-N characteristic curve gets out of the predetermined region of speed change. After the V-N characteristic curve gets out of the region of speed change, the necessity of continuation of acceleration or deceleration is determined on the basis of a predetermined condition such as returning of an accelerator grip, and when the continuation is unnecessary, normal map control is automatically restored.

28 Claims, 14 Drawing Sheets

(56) References Cited

U.S. PATENT DOCUMENTS

| | | | |
|---|---|---|---|
| 5,612,873 A * | 3/1997 | Ogawa | 701/51 |
| 5,924,955 A * | 7/1999 | Ishii et al. | 477/48 |
| 6,088,645 A * | 7/2000 | Kawasaki et al. | 701/67 |
| 6,192,306 B1 * | 2/2001 | Kidokoro et al. | 701/51 |
| 6,278,915 B1 * | 8/2001 | Deguchi et al. | 701/22 |
| 6,358,179 B1 * | 3/2002 | Sakai et al. | 475/216 |
| 6,368,247 B1 * | 4/2002 | Kondo | 477/47 |
| 6,379,282 B1 * | 4/2002 | Aoki | 477/109 |
| 6,419,040 B2 * | 7/2002 | Kitano et al. | 180/243 |
| 6,450,917 B2 * | 9/2002 | Taniguchi et al. | 477/49 |
| 7,037,236 B2 * | 5/2006 | Ishibashi et al. | 477/52 |
| 7,228,219 B2 * | 6/2007 | Tominaga et al. | 701/96 |
| 2003/0216847 A1 * | 11/2003 | Bellinger | 701/51 |
| 2004/0110599 A1 * | 6/2004 | Jozaki et al. | 477/44 |
| 2004/0243293 A1 * | 12/2004 | Tominaga et al. | 701/41 |
| 2006/0217230 A1 * | 9/2006 | Tanaka | 477/110 |
| 2007/0021261 A1 * | 1/2007 | Morise et al. | 475/119 |
| 2007/0027602 A1 * | 2/2007 | Unno et al. | 701/51 |
| 2007/0270280 A1 * | 11/2007 | Takamatsu | 477/125 |

FOREIGN PATENT DOCUMENTS

| | | |
|---|---|---|
| DE | 19963354 | 7/2001 |
| EP | 0602672 | 12/1993 |
| EP | 0893626 | 1/1999 |
| EP | 1188959 | 3/2002 |
| JP | 04-131558 | 5/1992 |

* cited by examiner

CONTROLLER OF CONTINUOUSLY VARIABLE TRANSMISSION AND VEHICLE PROVIDED WITH THE SAME

RELATED APPLICATIONS

This application claims the benefit of priority under 35 USC 119 in prior Japanese application no. 2005-206990, filed on Jul. 15, 2005, and in prior Japanese application no. 2006-162362, filed on Jun. 12, 2006.

BACKGROUND OF THE INVENTION

1. Field of the Invention

The present invention relates to a controller of a continuously variable transmission mounted on a vehicle provided with an accelerator manipulating element, which is manipulated by hand, and a vehicle provided with the same.

2. Description of Related Art

Conventionally, a V-belt type continuously variable transmission is used as a manipulating element for accelerating or decelerating a vehicle, such as a scooter type motorcycle, etc., that is provided with an accelerator manipulating element manipulated by hand (for example, an accelerator grip, an accelerator lever, etc.). One type of continuously variable transmission that is conventionally and frequently used is a so-called mechanical type continuously variable transmission, which comprises a centrifugal governor, wherein a speed change ratio is automatically regulated by a centrifugal force generated on the centrifugal governor at the time of rotation.

An engine rotational frequency of a conventional motorcycle or the like, on which a mechanical type continuously variable transmission is mounted, is fundamentally controlled by a throttle opening degree and a vehicle speed. While a speed change ratio can be steplessly regulated by a continuously variable transmission, a speed change ratio is controlled so that V-N characteristics prescribed by a vehicle speed (V) and an engine rotational frequency (N) fall in a predetermined region of speed change. For example, as shown in FIG. 7, a region (hatched region) S of speed change is defined by a V-N characteristic curve A1, wherein an accelerator is fully opened to accelerate under the condition of a normal load (i.e., in the case where one person takes a vehicle on a flat road), and by a V-N characteristic curve A2, wherein the accelerator is fully closed to decelerate under such condition. A speed change ratio is set so that V-N characteristics (in FIG. 7, a point prescribed by a vehicle speed, which is a parameter on the abscissa, and an engine rotational frequency, which is a parameter on the ordinate) do not deviate from the defined region S of speed change. That is, conventionally, deviation from the region S of speed change does not occur even at the time of acceleration from a stopping state and at the time of acceleration during traveling.

However, a motorcycle or the like, on which a mechanical type continuously variable transmission is mounted, experience slow acceleration when accelerating on a steep, upward slope and when accelerating with a double ride. Also, engine braking is less effective when an accelerator is returned. In view of these problems, an electronic controlled type continuously variable transmission has been developed, in which a belt wound diameter of a sheave is controlled by an electric motor or the like to freely regulate a speed change ratio irrespective of a running state.

In one such electronic controlled type continuously variable transmission, a plurality of operation modes are prepared in advance and a driver switches modes to modify the V-N characteristics stepwise. There may be two kinds of operation modes, for example, such as a normal mode and a power mode, which attaches greater importance to quality of acceleration than that with the normal mode. When a driver switches from the normal mode to the power mode, a speed change ratio is modified to be rather large (Low side) and an engine rotational frequency is controlled to be rather high in a range of the region of speed change.

However, with only two operation modes it is difficult to constantly generate a feeling of acceleration which satisfies the driver. To satisfy the driver, it is conceivable to prepare a multiplicity of operation modes that can be selected according to a situation.

Japanese Patent Publication No. 04-131558 discloses a continuously variable transmission provided with a manual type reduction lever, in which a speed change ratio is optionally adjustable in a predetermined region of speed change. With such a continuously variable transmission, the reduction lever can be set to an optional position between a fully closed position and a fully opened position. Therefore, it is possible to minutely regulate a speed change ratio unlike the related art, in which a speed change ratio can be regulated only stepwise. For example, the driver may manipulate the reduction lever at a time of rapid acceleration to obtain a high engine rotational frequency value. This type of continuously variable transmission includes, so to speak, an infinite number of operation modes between which the driver can optionally switch.

However, conventional continuously variable transmissions can control a speed change ratio only within the limit of the region of speed change described above. Therefore, in conventional motorcycles, a whole region in which speed change can be effectively attained is not made use of, and engine performance is therefore not maximized.

Also, with the conventional continuously variable transmissions, in order to get enough acceleration when traveling on a steep, upward slope, or the like, a driver must manipulate a mode selection switch, a reduction lever, or the like, which is troublesome.

Also, after the operation mode is switched to obtain a necessary acceleration, the driver may forget to return the mode selection switch to its original state. Therefore, for example, operation in a state where engine rotational frequency is higher than normal may continue over an unintendedly long period of time.

SUMMARY OF THE INVENTION

The invention has been thought of in view of such point and has as one object to provide a controller of a continuously variable transmission that sufficiently makes use of an engine performance inherent in a motorcycle or the like.

A further object of the invention is to provide a controller of a continuously variable transmission, which attains a desired acceleration or deceleration without troublesome manipulation by the driver.

A still further object of the invention is to prevent continued operation in a state where engine rotational frequency is higher than normal, long after a desired acceleration or deceleration is attained.

Accordingly, the invention provides a controller of a continuously variable transmission mounted on a vehicle that includes an engine and an accelerator manipulating element manipulated by hand. The controller comprises an accelerator manipulated variable detector that detects a manipulated variable of the accelerator manipulating element, and a speed change ratio controller that sets a target speed change ratio of the continuously variable transmission on the basis of the manipulated variable of the accelerator manipulating element, and that controls the continuously variable transmission so that a speed change ratio becomes the target speed change ratio. The speed change ratio controller comprises a standard speed change ratio setting unit that sets a target speed change ratio so that V-N characteristics prescribed by a vehicle speed and an engine rotational frequency fall in a predetermined region of speed change, when a manipulated variable of the accelerator manipulating element is in a predetermined standard range; a specific speed change ratio setting unit that sets a target speed change ratio so that the V-N characteristics get out of the predetermined region of speed change, when a manipulated variable of the accelerator manipulating element exceeds the standard range; and an automatic return unit that resets a target speed change ratio so that the V-N characteristics, having gotten out of the predetermined region of speed, return to the predetermined region of speed change.

Also, the invention provides a further controller of a continuously variable transmission mounted on a vehicle that includes an engine and an accelerator manipulating element manipulated by hand. The controller comprises a load detector that detects a load on the vehicle, and a speed change ratio controller that sets a target speed change ratio of the continuously variable transmission on the basis of the load on the vehicle, and that controls the continuously variable transmission so that a speed change ratio becomes the target speed change ratio. The speed change ratio controller comprises a standard speed change ratio setting unit that sets a target speed change ratio so that V-N characteristics prescribed by a vehicle speed and an engine rotational frequency falls in a predetermined region of speed change, when the load on the vehicle is in a predetermined standard range; a specific speed change ratio setting unit that sets a target speed change ratio so that the V-N characteristics get out of the predetermined region of speed change, when the load on the vehicle exceeds the standard range; and an automatic return unit that resets a target speed change ratio so that the V-N characteristics, having gotten out of the predetermined region of speed, return to the predetermined region of speed change.

Also, the invention provides a further controller of a continuously variable transmission mounted on a vehicle that includes an engine and an accelerator manipulating element manipulated by hand. The controller comprises an accelerator manipulated variable detector that detects a manipulated variable of the accelerator manipulating element, a load detector that detects a load on the vehicle, and a speed change ratio controller that sets a target speed change ratio of the continuously variable transmission on the basis of a manipulated variable of the accelerator manipulating element and the load on the vehicle, and that controls the continuously variable transmission so that a speed change ratio becomes the target speed change ratio. The speed change ratio controller comprises a standard speed change ratio setting unit that sets a target speed change ratio so that the V-N characteristics prescribed by a vehicle speed and an engine rotational frequency falls in a predetermined region of speed change, when a manipulated variable of the accelerator manipulating element or the load on the vehicle is in a predetermined standard range; a specific speed change ratio setting unit that sets a target speed change ratio so that the V-N characteristics get out of the predetermined region of speed change, when a manipulated variable of the accelerator manipulating element and the load on the vehicle exceed the standard ranges; and an automatic return unit that resets a target speed change ratio so that the V-N characteristics, having gotten out of the predetermined region of speed, return to the predetermined region of speed change.

With the controller, when a manipulated variable of the accelerator manipulating element or the load on the vehicle exceeds the standard ranges, a target speed change ratio is set so that the V-N characteristics get out of the predetermined region of speed change. Thereby, it is possible to get enough acceleration or deceleration, which cannot be gotten within the limit of a predetermined region of speed change. Also, a driver is not required to make a troublesome manipulation. Further, with the controller, the automatic return unit resets a target speed change ratio whereby the V-N characteristics, having gotten out of a predetermined region of speed, automatically return to the region of speed change. Therefore, return of the V-N characteristics to the predetermined region of speed change is not forgotten.

According to the invention, a speed change ratio, which exceeds a preset region of speed change, can be controlled, so that it is possible to sufficiently make use of an engine performance inherent to a motorcycle, etc.

Also, since it is not necessary to switch an operation mode, the desired acceleration or deceleration can be attained without a troublesome manipulation by the driver.

Further, according to the invention, the V-N characteristics, having gotten out of a predetermined region of speed, automatically return to the region of speed change, so that continued operation in a state in which an engine rotational frequency is higher than normal, long after the desired acceleration is attained, is prevented.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention is described below in detail with reference to the drawings.

Figure 1:
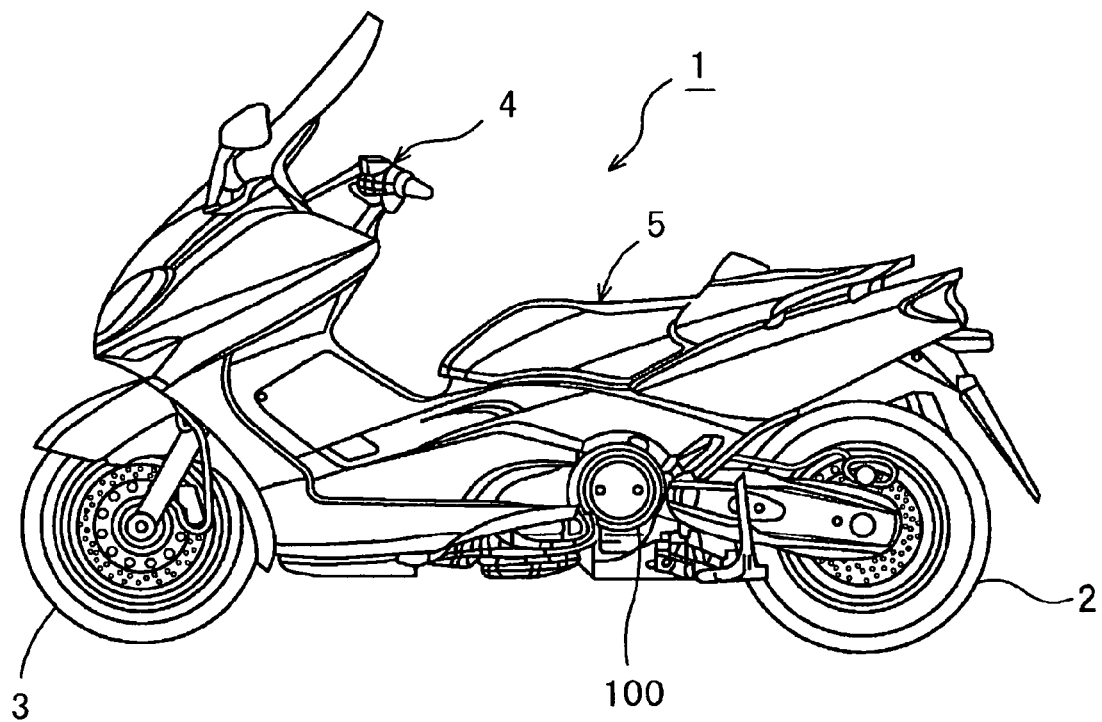
FIG. 1 is a side view showing a motorcycle according to an embodiment of the invention.

As shown in FIG. 1, a vehicle according to this embodiment is a scooter type motorcycle 1. The motorcycle 1 comprises a vehicle body 5, an engine 100 mounted to the vehicle body 5, a front wheel 3, a rear wheel 2, and a steering handle 4.

Figure 2:
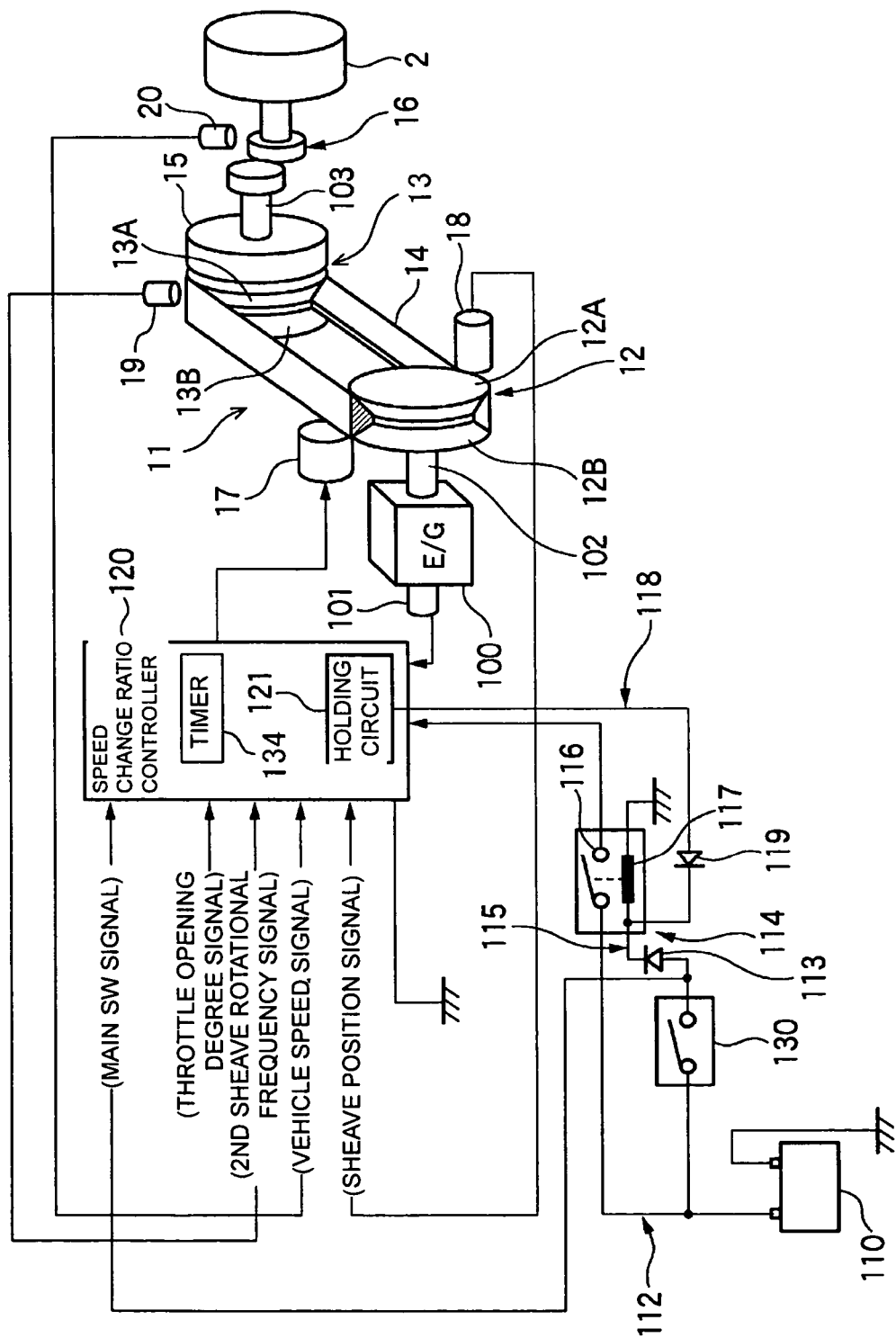
FIG. 2 is block diagram showing a continuously variable transmission and a controller thereof.

As shown in FIG. 2, a V-belt type continuously variable transmission 11 is arranged in a power transmission path between the engine 100 and the rear wheel 2. The continuously variable transmission 11 comprises a primary sheave 12, a secondary sheave 13, and a V-belt 14 wound around the primary sheave 12 and the secondary sheave 13. The primary sheave 12 is connected to a primary shaft 102 (for example, a crankshaft) that rotates as the engine 100 rotates. The secondary sheave 13 is connected to a secondary shaft 103 that outputs a motive power to the rear wheel 2 (drive wheel) through a centrifugal clutch 15 and a speed reducer 16.

The primary sheave 12 includes a stationary sheave 12A and a moving sheave 12B, and a V-groove is formed between the stationary sheave 12A and the moving sheave 12B to interpose the V-belt 14. The secondary sheave 13 also includes a stationary sheave 13A and a moving sheave 13B, and a V-groove is also formed between the stationary sheave 13A and the moving sheave 13B to interpose the V-belt 14. Driving force of the engine 100 is transmitted to the rear wheel 2 through the primary sheave 12, the V-belt 14, and the secondary sheave 13.

In the continuously variable transmission 11, when the moving sheave 12B of the primary sheave 12 or the moving sheave 13B of the secondary sheave 13 is moved axially, the V-groove is varied in width to be varied in diameter, at which V-belt 14 is wound around the respective sheaves 12, 13. Thereby, a speed change ratio between the both sheaves 12, 13 is continuously regulated.

The continuously variable transmission 11 comprises, as a device that regulates a speed change ratio, a sheave position shifting device 17 that axially shifts the moving sheave 12B of the primary sheave 12. While illustration is omitted, the sheave position shifting device 17 comprises an electric motor that shifts the moving sheave 12B. However, the sheave position shifting device 17 is in no way limited in specific construction. A drive source that shifts the moving sheave 12B is not limited to an electric motor.

Figure 3:
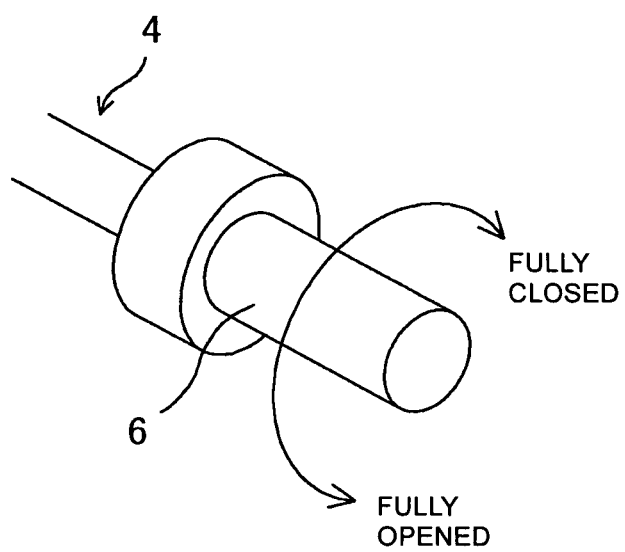
FIG. 3 is a perspective view showing an accelerator grip.

As shown in FIG. 3, the steering handle 4 of the motorcycle 1 is provided with an accelerator grip 6 as an accelerator manipulating element, which is manipulated by a driver's hands. The accelerator grip 6 is constructed to be rotatable between a fully closed position and a fully opened position. The position to which the accelerator grip 6 is rotated from the fully closed position, or an accelerator opening degree, is the manipulated variable of the accelerator manipulating element. Normally, an accelerator opening degree increases at the time of acceleration and decreases at the time of deceleration. Therefore, the accelerator opening degree is a parameter representative of a driver's intention of acceleration or deceleration.

Figure 4:
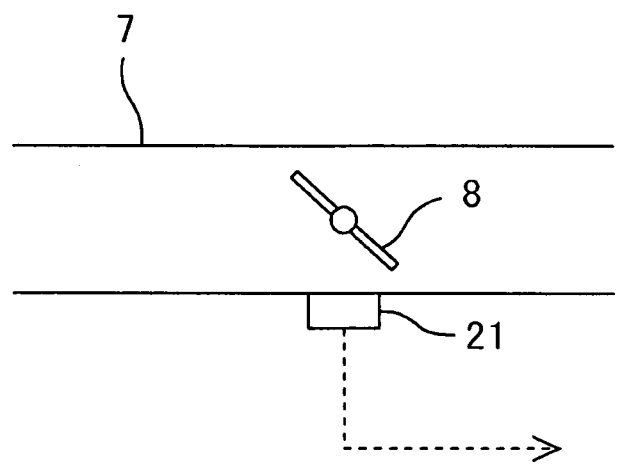
FIG. 4 is a conceptual view showing a throttle valve and a throttle opening degree sensor.

As shown in FIG. 4, an intake pipe 7 of the engine 100 is provided with a throttle valve 8, which is operated by the accelerator grip 6, and a throttle opening degree sensor 21, which detects an opening degree of the throttle valve 8. The opening degree of the throttle valve 8 is regulated according to the accelerator opening degree. Therefore, the throttle opening degree sensor 21 detects the opening degree of the throttle valve 8 to thereby detect the accelerator opening degree indirectly. Thus, the throttle opening degree sensor 21 functions as an accelerator manipulated variable detection device that detects the accelerator opening degree. However, the accelerator manipulated variable detection device is in no way limited to this construction. For example, the accelerator manipulated variable detection device may be one that detects an accelerator opening degree directly.

As shown in FIG. 2, the continuously variable transmission 11 is provided with a sheave position detection device 18, which detects a position of the moving sheave 12B in an axial direction. When a position of the moving sheave 12B is decided, a speed change ratio of the continuously variable transmission 11 is unequivocally determined. Accordingly, the speed change ratio of the continuously variable transmission 11 is detected by the sheave position detection device 18. Also provided on the motorcycle 1 are a secondary sheave rotational frequency sensor 19, which detects the rotational frequency of the secondary sheave 13, a vehicle speed sensor 20, which detects the rotational frequency of the rear wheel 2 to thereby detect a running speed (vehicle speed), and an engine rotational frequency sensor 101, which detects the rotational frequency of the engine 100. In addition, while the motorcycle 1 may be provided with an exclusive acceleration sensor, which detects acceleration, an exclusive acceleration sensor can be omitted since it is possible to calculate an acceleration on the basis of a vehicle speed.

A speed change ratio controller 120, which sets a target speed change ratio of the continuously variable transmission 11 and controls the sheave position shifting device 17 so that a speed change ratio of the continuously variable transmission 11 becomes the target speed change ratio, is provided on motorcycle 1. The speed change ratio controller 120 comprises a microcomputer as a main element. Input into the speed change ratio controller 120 are a main switch signal of a main switch 130, which controls ON/OFF of a general electric source of a vehicle, an engine rotational frequency signal output from the engine rotational frequency sensor 101, a throttle opening degree signal output from the throttle opening degree sensor 21, a secondary sheave rotational frequency signal output from the secondary sheave rotational frequency sensor 19, a vehicle speed signal output from the vehicle speed sensor 20, a sheave position signal output from the sheave position detection device 18, and the like. The speed change ratio controller 120 controls the engine 100 and the continuously variable transmission 11 on the basis of various signals described above. Details of the control of the continuously variable transmission 11 are described later.

The speed change ratio controller 120 is supplied with electric power from an on-board electric source 110 through a feed line 112. A relay circuit 114 having a self-hold function is provided on the feed line 112.

The relay circuit 114 comprises a relay switch 116, which controls supply of electric power to the speed change ratio controller 120 from the on-board electric source 110, and a switch control element 117, which controls the ON/OFF state of the relay switch 116. In the relay circuit 114, the main switch 130 is switched ON whereby a switch starting voltage is applied to the switch control element 117 via a first switch line 115.

When a switch starting voltage is applied from the first switch line 115, the switch control element 117 switches the relay switch 116 to a closed state from an opened state to close the feed line 112. Thereby, electric power is supplied to the speed change ratio controller 120 from the on-board electric source 110 and the speed change ratio controller 120 is put in a state capable of being driven. In this state, the continuously variable transmission 11, specifically, the sheave position shifting device 17, operates to control a position of the moving sheave 12B, thereby controlling the speed change ratio.

A second switch line 118, which supplies a switch starting voltage to the switch control element 117 to keep the relay switch 116 in a closed state is also connected to relay circuit 114. Until a predetermined condition stands even after the main switch 130 is switched OFF, the second switch line 118 supplies a switch starting voltage to the switch control element 117 to keep the relay switch 116 in a closed state.

The second switch line 118 is connected to a holding circuit 121 provided on the speed change ratio controller 120. The holding circuit 121 is composed of, for example, a capacitor, a diode, etc. and constructed to apply a voltage to the switch control element 117 via the second switch line 118 belonging to a separate system from that of the first switch line 115. In addition, the second switch line 118 is provided with a diode 119, which prevents reverse flow of electric current to the holding circuit 121 and flow of overcurrent to the holding circuit 121 via the second switch line 118 at the time of ON/OFF of the switch 130. Likewise, the first switch line 115 is provided with a diode 113, which prevents the speed change ratio controller 120 from erroneously judging that an electric current flows to the speed change ratio controller 120 from the second switch line 118 at the time of OFF of the main switch 130 and so a main switch signal is made ON.

The holding circuit 121 of the speed change ratio controller 120 is constructed to supply a voltage to the switch control element 117 via the second switch line 118 when supply of a voltage from the on-board electric source 110 via the feed line 112 is started. More specifically, a voltage is supplied to the switch control element 117 from lines of two systems, that is, the first switch line 115 via the switch 130 and the second switch line 118 via the holding circuit 121. The switch control element 117 switches the relay switch 116 to a closed state from an opened state to maintain a state wherein a voltage is supplied from either the first switch line 115 or the second switch line 118, and switches the relay switch 116 to an opened state from a closed state to interrupt supply of electric power to the speed change ratio controller 120 via the feed line 112 when no voltage is supplied from either line.

Further, according to the embodiment, the holding circuit 121 of the speed change ratio controller 120 continues to supply a voltage to the switch control element 117 via the second switch line 118 when a speed change ratio of the continuously variable transmission 11 is not Low, or the vehicle speed is not zero at a point in time when the main switch 130 is switched OFF.

While voltage is supplied to the switch control element 117 from the second switch line 118 and electric power is supplied from the feed line 112, the speed change ratio controller 120 exercises normal control of speed change on the basis of a vehicle speed and a throttle opening degree until the vehicle speed becomes zero, also after the main switch 130 is switched OFF. The speed change ratio controller 120 outputs an electric source cutting command to the holding circuit 121 at a stage at which a vehicle speed becomes zero. The holding circuit 121 is constructed to interrupt supply of voltage to the switch control element 117 via the second switch line 118 when an electric source cutting command is input thereto from the speed change ratio controller 120, whereby the relay switch 116 is shifted to an opened state from a closed state and supply of electric power to the speed change ratio controller 120 from the on-board electric source 110 is interrupted.

According to this embodiment, even when the main switch 130 is switched OFF, by any chance when the V-N characteristics are put in a state of getting out of a predetermined region S of speed change (as will be described later in detail), the electric source is ensured until a speed change ratio becomes Low.

Figure 5:
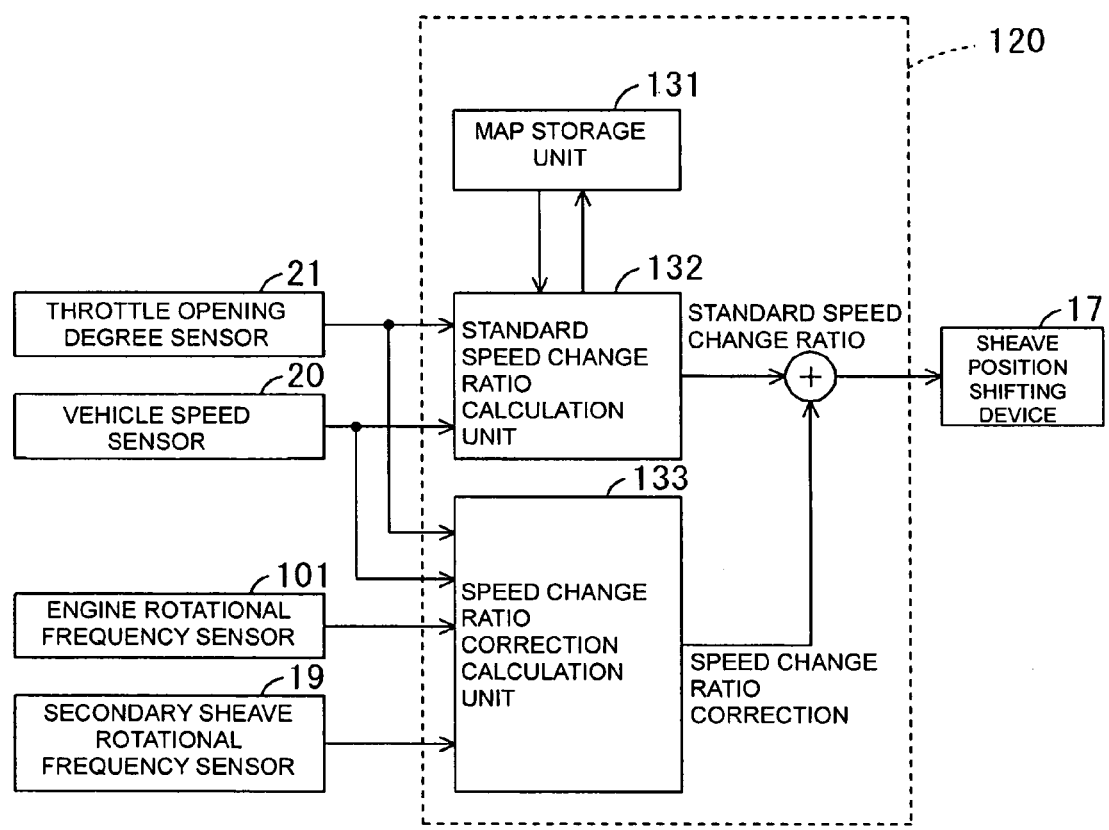
FIG. 5 is block diagram showing a part of a construction of the controller.

As shown in FIG. 5, the speed change ratio controller 120 comprises a map storage unit 131, which stores a predetermined speed change ratio map, a standard speed change ratio calculation unit 132, which calculates a speed change ratio (standard speed change ratio) according to the speed change ratio map, a speed change ratio correction calculation unit 133, which calculates a correction of speed change ratio, and a timer 134 (see FIG. 2) capable of measuring time elapsed from a predetermined reference time.

Next, control of speed change exercised by the speed change ratio controller 120 is described with reference to FIG. 6.

The speed change ratio controller 120 normally exercises map control according to a predetermined speed change ratio map (STEP S1). While a specific construction of the change ratio map is in no way limited, the change ratio map according to this embodiment prescribes a standard target speed change ratio for a combination of a vehicle speed and a throttle opening degree. The target speed change ratio decreases (comes to a so-called Top side) as a vehicle speed increases while it conversely increases (comes to a so-called Low side) as a vehicle speed decreases. Also, the target speed change ratio decreases as a throttle opening degree decreases while it conversely increases as a throttle opening degree increases. However, a standard target speed change ratio (referred below to as a standard speed change ratio) according to the change ratio map is set so that the V-N characteristics fall in a predetermined region of speed change.

In the map control, a target engine rotational frequency is calculated on the basis of a throttle opening degree signal from the throttle opening degree sensor 21 and a vehicle speed signal from the vehicle speed sensor 20. Subsequently, a target speed change ratio, at which a target engine rotational frequency is attained, is calculated according to the change ratio map. The sheave position shifting device 17 axially shifts the moving sheave 12B so that a speed change ratio of the continuously variable transmission 11 becomes the target speed change ratio.

The speed change ratio controller 120 first determines a driver's intention of acceleration or deceleration in STEP S2. Here, an accelerator opening degree is used as a parameter that reflects a driver's intention of acceleration or deceleration. Specifically, it is determined whether the accelerator opening degree falls in a predetermined range, and in case of being outside the predetermined range, the procedure proceeds to STEP S3. On the other hand, in the case where the accelerator opening degree falls in the predetermined range, the processing in STEP S2 is repeated. That is, it is judged that acceleration or deceleration at a standard speed change ratio is sufficient, and the map control is continued.

It is determined in STEP S3 whether a load on a vehicle falls in a predetermined range. In the case where the load on the vehicle falls in the predetermined range, the procedure proceeds to STEP S9 and a normal map control is continued. On the other hand, in the case where the load on the vehicle is larger than the predetermined range, it is judged that enough acceleration or deceleration is not obtained at the standard speed change ratio, and the procedure proceeds to STEP S4 on and after.

In addition, factors in variation of a load on a vehicle include, for example, inclination of a slope of a travel path, a condition of a travel path, a vehicle weight (weight of cargo, driver, passenger, or the like), etc. A vehicle load can be calculated on the basis of vehicle traveling data such as vehicle speed, an accelerator opening degree, acceleration, engine rotational frequency, etc. According to this embodiment, a load detection device comprises the vehicle speed sensor 20, the engine rotational frequency sensor 101, etc. The vehicle load may also be calculated on the basis of signals from other sensors such as an acceleration sensor, an inclination sensor, which detects an inclination of a travel path, a torque sensor, etc. Other known methods can be used for a method of calculating a vehicle load. A construction and a method for calculation of a vehicle load are in no way limited.

In STEP S4 on and after, a target speed change ratio is corrected so that the V-N characteristics get out of a predetermined region of speed change. More specifically, a correction relative to a standard speed change ratio is calculated on the basis of an operating state of a vehicle and a speed change ratio obtained by correcting the standard speed change ratio is made a new target speed change ratio. First, in STEP S4, a correction of a target speed change ratio is calculated on the basis of a throttle opening degree, a vehicle speed, an engine rotational frequency, and a rotational frequency of the secondary sheave. In the case where an accelerator opening degree is large, or a vehicle load is large, a correction is calculated so that a target speed change ratio becomes large. When a correction is calculated in STEP S4, the procedure proceeds to STEP S5.

In STEP S5, a standard speed change ratio is corrected on the basis of the correction. A speed change ratio after being corrected is set as a new target speed change ratio. The target speed change ratio is set so that the V-N characteristics get out of the predetermined region of speed change. In other words, a target speed change ratio is set in STEP S5 without being restricted by a preset speed change region.

The method for calculation of a target speed change ratio is in no way limited. For example, an increase in a speed change ratio may be calculated as a correction in STEP S4 and a target speed change ratio may be calculated by adding the increase to a standard speed change ratio in STEP S5. Also, a correction factor may be calculated as a correction in STEP S4 and a target speed change ratio may be calculated by multiplying a standard speed change ratio by the correction factor in STEP S5. When a target speed change ratio is calculated in STEP S5, the procedure successively proceeds to STEP S6.

When a vehicle is too large in acceleration or deceleration, there is a risk of engine stall and engine over rev. Thus, upper and lower limits of a speed change ratio are corrected in STEP S6. Specifically, it is determined whether a target speed change ratio calculated in STEP S5 falls in that range of an effective speed change ratio, which does not cause engine stall and engine over rev, and in case of falling in the range, the target speed change ratio calculated is set as a new target speed change ratio. Conversely, if the calculated target speed change ratio is in a range that may cause engine stall or engine over rev, a preset upper limit or lower limit is set as the new target speed change ratio in case of getting out of the range.

In addition, the STEP S2 to STEP S6 constitute a specific speed change ratio setting unit that sets a target speed change ratio so that the V-N characteristics get out of the region of speed change.

Next, the procedure proceeds to STEP S7, in which a control signal is output to the sheave position shifting device 17 from the speed change ratio controller 120 so that a speed change ratio of the continuously variable transmission 11 becomes a target speed change ratio. Receiving the control signal, the sheave position shifting device 17 axially shifts the moving sheave 12B to thereby regulate a speed change ratio.

Next, it is determined on the basis of a predetermined condition in STEP S8 whether acceleration or deceleration should be continued. When it is determined that acceleration or deceleration should be continued, the procedure returns to STEP S3. On the other hand, when it is determined that it is unnecessary to continue acceleration or deceleration, a target speed change ratio is reset so as to cause returning to map control based on a standard speed change ratio. Consequently, a normal map control is exercised (STEP S9) and the V-N characteristics, having gotten out of the predetermined region of speed change, automatically return to the region of speed change. The STEP S8 and STEP S9 constitute an automatic return unit that resets a target speed change ratio so that the V-N characteristics, having gotten out of the region of speed, return to the region of speed change.

Various conditions can be adopted to determine whether continued acceleration or deceleration is necessary in STEP S8. For example, the necessity of continuation may be determined on the basis of an accelerator opening degree. Usually, when enough acceleration is obtained, the driver returns the accelerator grip 6 to decrease acceleration. Thus, when an accelerator opening degree becomes equal to or less than a predetermined opening degree after acceleration, the procedure may proceed to STEP S9 to begin resetting of a target speed change ratio.

Also, resetting of a target speed change ratio may begin on the basis of variation (for example, an increase or a decrease per unit time, i.e., an accelerator speed) in accelerator opening degree instead of an accelerator opening degree itself. For example, when a decrease (a decrease in manipulated variable of the accelerator manipulating element) in accelerator opening degree becomes equal to or more than a predetermined amount after acceleration, resetting of a target speed change ratio may begin. For example, in the case where return of the accelerator grip 6 is performed after the accelerator grip 6 is suddenly opened, that is, after rapid acceleration is performed by making an accelerator opening degree equal to or more than the predetermined opening degree, resetting of a target speed change ratio may begin.

Also, when enough deceleration is obtained, a driver usually opens the accelerator grip 6 to decrease deceleration. Thus, when an increase in accelerator opening degree becomes equal to or more than the predetermined amount after deceleration, resetting of a target speed change ratio may begin. For example, in the case where the accelerator grip 6 is opened after rapid deceleration is performed by making an accelerator opening degree equal to or less than the predetermined opening degree, resetting of a target speed change ratio may be begun.

The determination in STEP S8 can also be made on the basis of acceleration of a vehicle. For example, when acceleration becomes equal to or less than a predetermined value due to a driver's manipulation (for example, a driver returns the accelerator grip 6, or applies the brake, or the like) after acceleration is once performed, resetting of a target speed change ratio may begin presuming that further acceleration is not necessary. Also, when a decrease in acceleration becomes equal to or more than a predetermined value due to a driver's manipulation after acceleration is once performed, resetting of a target speed change ratio may begin.

Conversely, when acceleration becomes equal to or more than the predetermined value after acceleration is once performed, resetting of a target speed change ratio may begin presuming that acceleration is enough at that point in time and further acceleration is not necessary.

The determination in STEP S8 can also be made on the basis of travel speed. For example, when travel speed becomes equal to or less than a predetermined value due to a driver's manipulation after acceleration is once performed, resetting of a target speed change ratio may begin presuming that further acceleration is not necessary. Also, when a decrease in travel speed becomes equal to or more than a predetermined amount due to a driver's manipulation after acceleration is once performed, resetting of a target speed change ratio may begin.

Conversely, when a vehicle accelerates and travel speed becomes equal to or more than the predetermined value, resetting of a target speed change ratio may begin presuming that further acceleration is not necessary at that point in time. When further acceleration becomes necessary, a driver manipulates the accelerator grip 6 again to enable setting a target speed change ratio rather large again.

When travel speed becomes equal to or more than the predetermined value due to a driver's manipulation after deceleration is once performed, resetting of a target speed change ratio may begin presuming that further deceleration is not necessary. Also, when an increase in travel speed becomes equal to or more than a predetermined amount due to a driver's manipulation after deceleration is once performed, resetting of a target speed change ratio may begin.

Conversely, when a vehicle decelerates and travel speed becomes equal to or less than the predetermined value, resetting of a target speed change ratio may begin presuming that further deceleration is not necessary at that point in time. The reason for this is that when travel speed becomes low to a certain degree, it is possible to realize favorable deceleration or stoppage with a normal map control even when enough engine braking is not effected.

The determination in STEP S8 can also be made on the basis of engine rotational frequency. For example, when engine rotational frequency becomes equal to or less than a predetermined value due to a driver's manipulation after a vehicle accelerates or decelerates once, resetting of a target speed change ratio may begin presuming that further acceleration or deceleration is not necessary. Also, when a decrease in engine rotational frequency becomes equal to or more than a predetermined amount due to a driver's manipulation after acceleration or deceleration is effected once, resetting of a target speed change ratio may begin.

Also, when a vehicle accelerates or decelerates and engine rotational frequency becomes equal to or more than the predetermined value, resetting of a target speed change ratio may begin presuming that further acceleration or deceleration is not necessary at that point in time.

The determination in STEP S8 can also be made on the basis of a predetermined elapsed time. For example, when the V-N characteristics get out of a predetermined region of speed change, or when a predetermined period of time elapses since a base time when a predetermined processing in STEP S4, or in STEP S7, etc. began, resetting of a target speed change ratio may begin presuming that further acceleration or deceleration is not necessary at that point in time.

Figure 7:
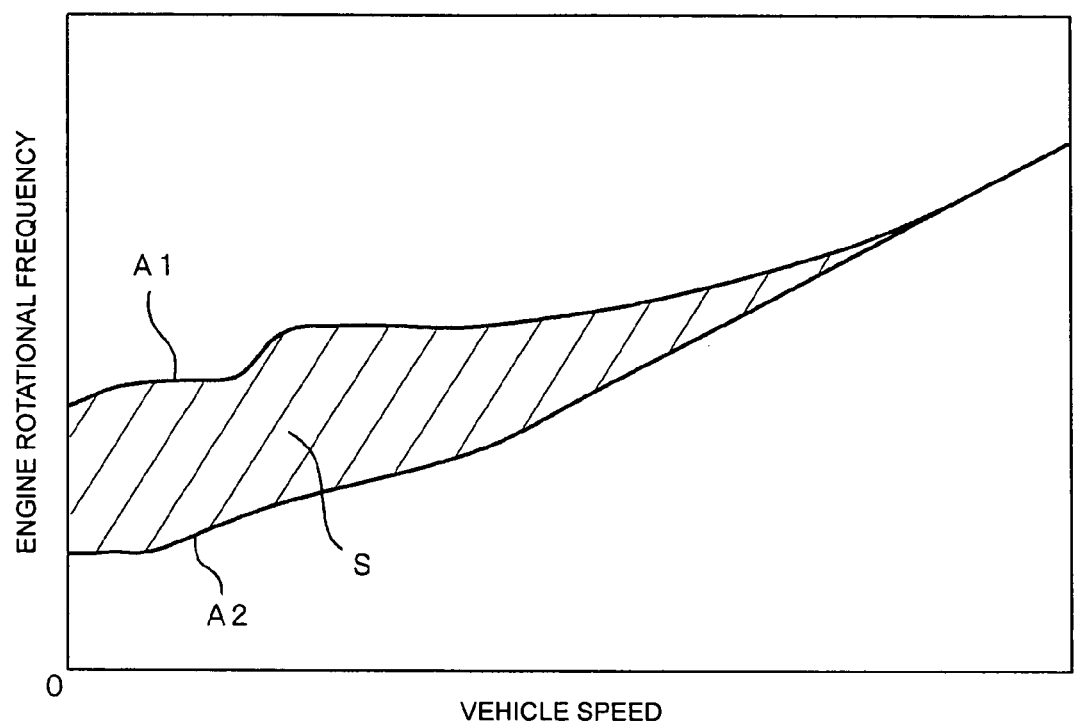
FIG. 7 is a graph illustrating a region of speed change.

Modification of the V-N characteristics will now be explained. A region (hatched region) S surrounded by a characteristic curve A1 and a characteristic curve A2 in FIG. 7 represents a region of speed change of the continuously variable transmission 11. In exercising the map control, a target speed change ratio is set so that the V-N characteristics fall in the region S of speed change. In addition, the characteristic curve A1 and the characteristic curve A2, which define the region S of speed change, are upper limit and lower limit characteristic curves in the range of map control. According to the embodiment, the characteristic curve A1 is a case where the accelerator is fully opened to perform acceleration under the condition of a normal load (in the case where one person takes a vehicle on a flat road). On the other hand, the characteristic curve A2 is a case where the accelerator is fully closed to perform deceleration under the condition of a normal load.

Figure 8:
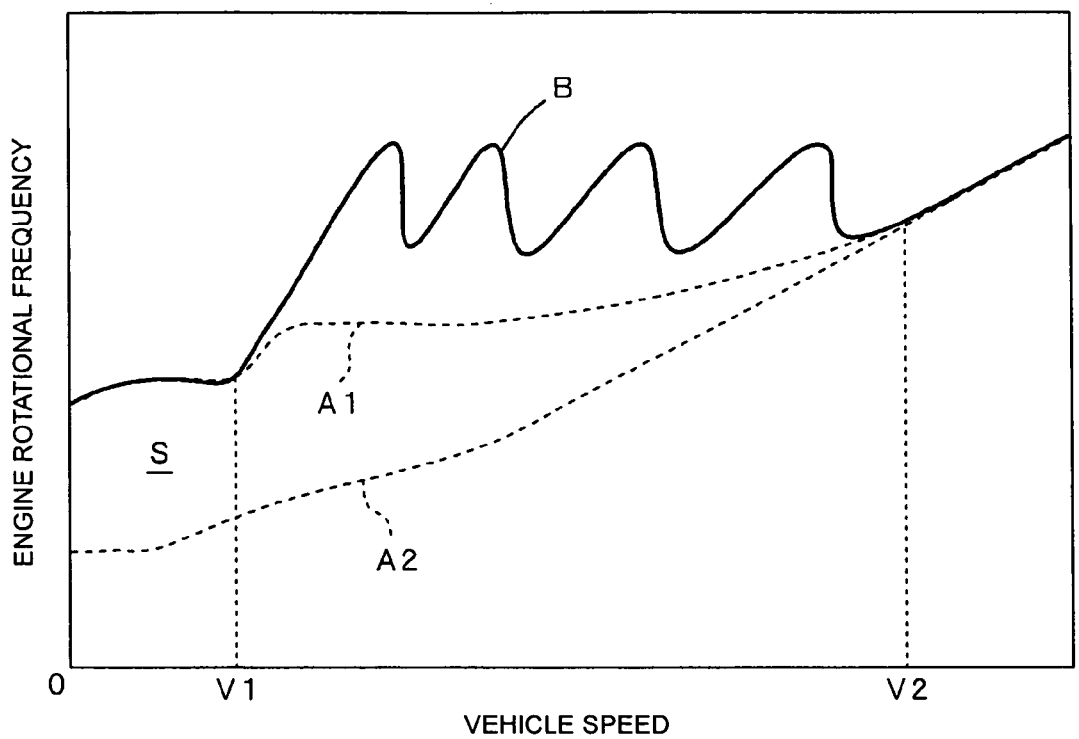
FIG. 8 is a graph illustrating an example of a V-N characteristic curve.

FIG. 8 shows an example of a V-N characteristic curve B in a case where rapid acceleration is performed at the time of departure. In this example, a normal map control is exercised until a vehicle speed reaches V1 from 0. During this time, the V-N characteristic curve B falls in the region S of speed change (on the characteristic curve A1). However, when the vehicle speed exceeds V1, the V-N characteristic curve B gets out of the region S of speed change and a speed change ratio is corrected so that an engine rotational frequency increases. Consequently, a driver gets a feeling of enough acceleration. When the vehicle speed reaches V2, the V-N characteristic curve B returns into the region S of speed change (on the characteristic curve A1).

Figure 9:
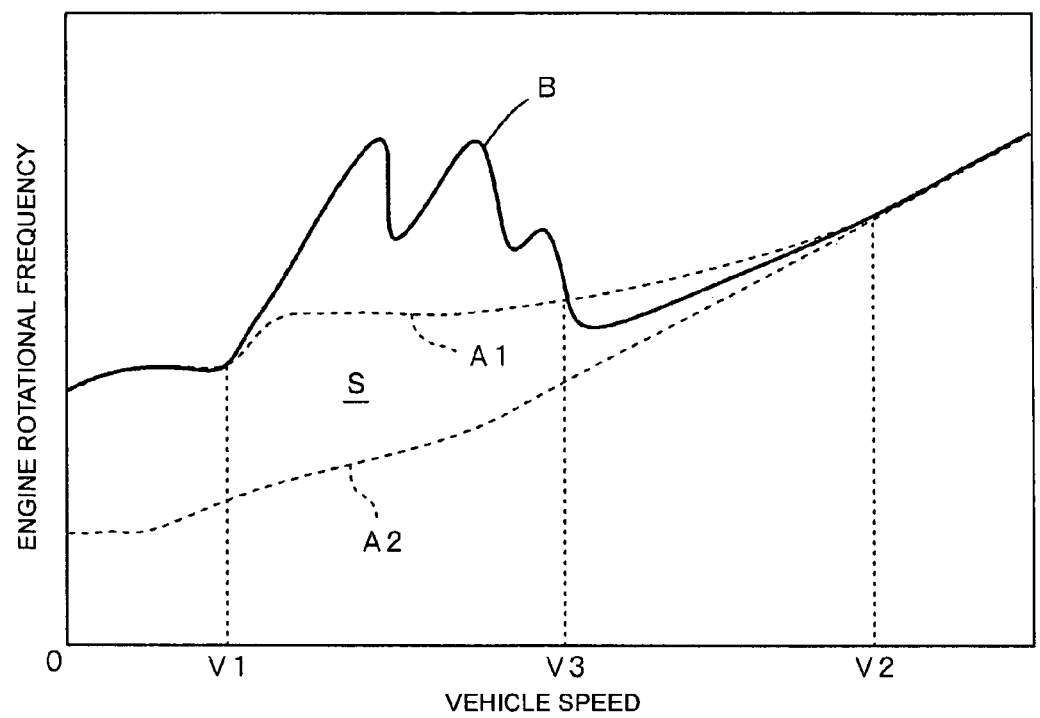
FIG. 9 is a graph illustrating a further example of a V-N characteristic curve.

The V-N characteristic curve B shown in FIG. 9 also represents a case where rapid acceleration is performed at the time of departure. In this example, before the vehicle speed reaches V2 after a vehicle speed exceeds V1 and the V-N characteristic curve B gets out of the region S of speed change, a predetermined condition (for example, a driver returns the accelerator grip 6, or a vehicle speed reaches a predetermined speed, or the like) is met and the V-N characteristic curve B returns into the region S of speed change at a point of time when the vehicle speed is V3. When the vehicle speed is equal to or larger than V3, a normal map control is exercised and the V-N characteristic curve B remains in the region S of speed change.

Figure 10:
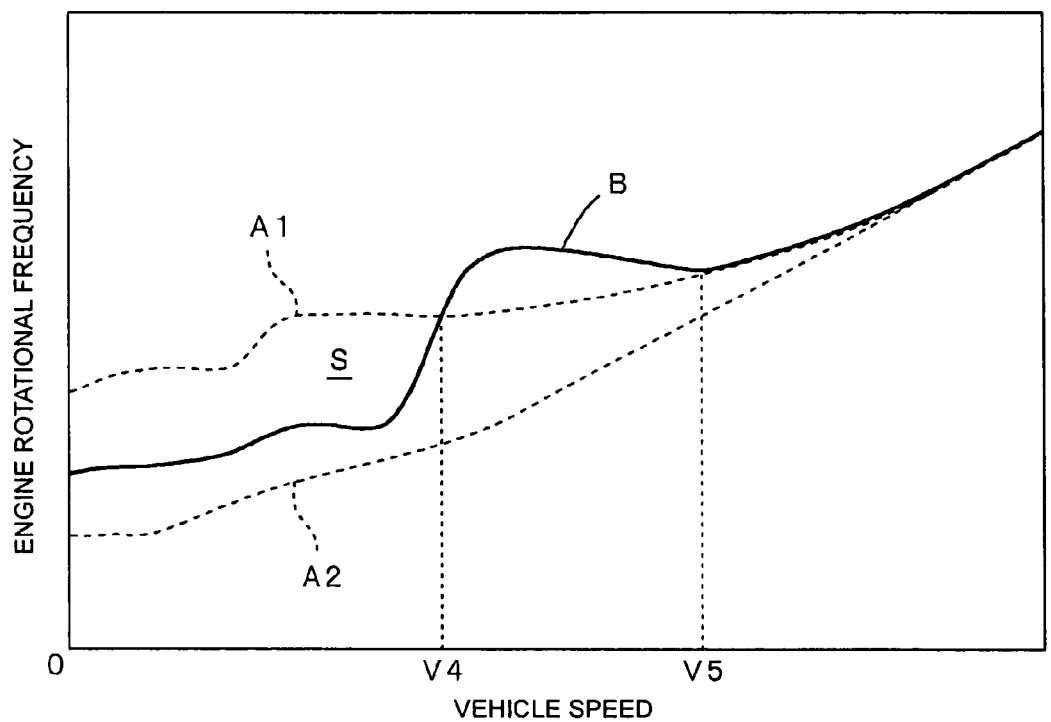
FIG. 10 is a graph illustrating a further example of a V-N characteristic curve.

FIG. 10 shows an example of a V-N characteristic curve B in a case where acceleration is performed on an upward slope of large inclination. In this example, it is judged from rapid acceleration at a vehicle speed V3 that an intention of acceleration is present to meet the condition of getting-out. Correction of a speed change ratio begins with the result that the V-N characteristic curve B gets out of the region S of speed change at a point in time when the vehicle speed exceeds V4, and the speed change ratio is corrected so that engine rotational frequency increases. Consequently, a driver can get a feeling of enough acceleration in spite of an upward slope of large inclination. Before the vehicle speed reaches V5, a predetermined condition (for example, a driver returns the accelerator grip 6, or acceleration reaches a predetermined speed, or the like) is met and at a point in time when the vehicle speed is V5, the V-N characteristic curve B returns into the region S of speed change (on the characteristic curve A1).

Figure 11:
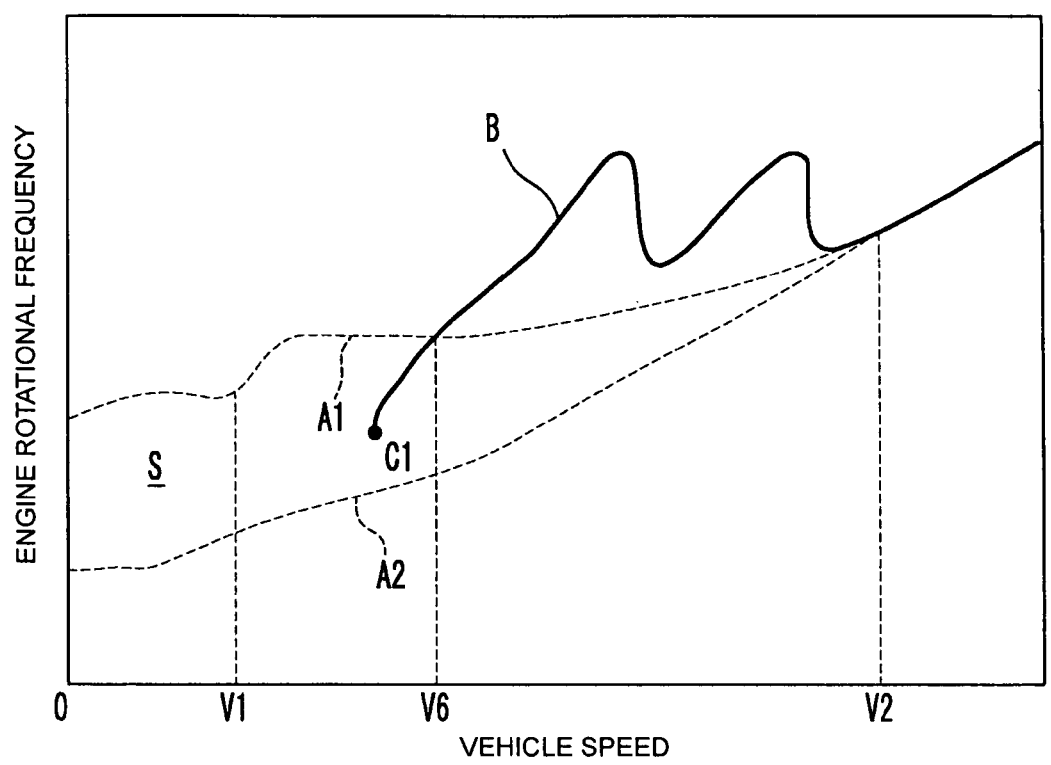
FIG. 11 is a graph illustrating a further example of a V-N characteristic curve.

FIG. 11 represents a case where rapid acceleration is made from a state (see a point C1) in the course of traveling. In this example, a speed change ratio is corrected judging that there is an intention of acceleration to meet the condition of getting-out at the time of acceleration. Consequently, at a point in time when the vehicle speed exceeds V6, the V-N characteristic curve B gets out of the region S of speed change and a speed change ratio is corrected so that engine rotational frequency increases. At a point in time when the vehicle speed reaches V2 after a predetermined condition of returning is met, the V-N characteristic curve B returns into the region S of speed change (on the characteristic curve A1).

Figure 12:
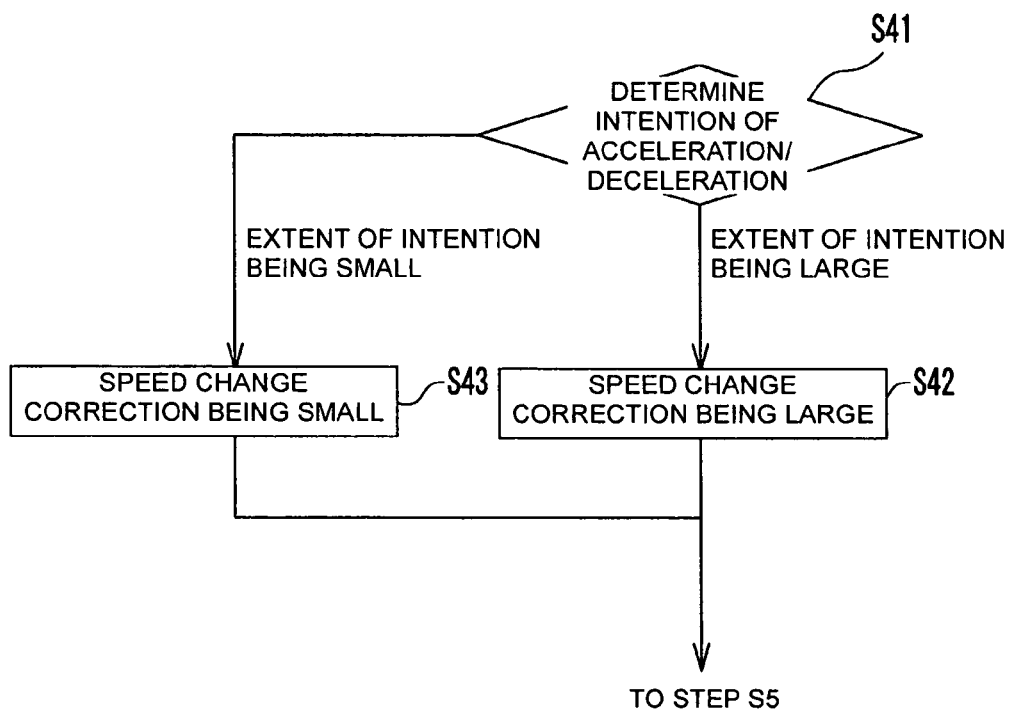
FIG. 12 is a flowchart illustrating an example of a method of calculating a speed change correction.
Figure 13:
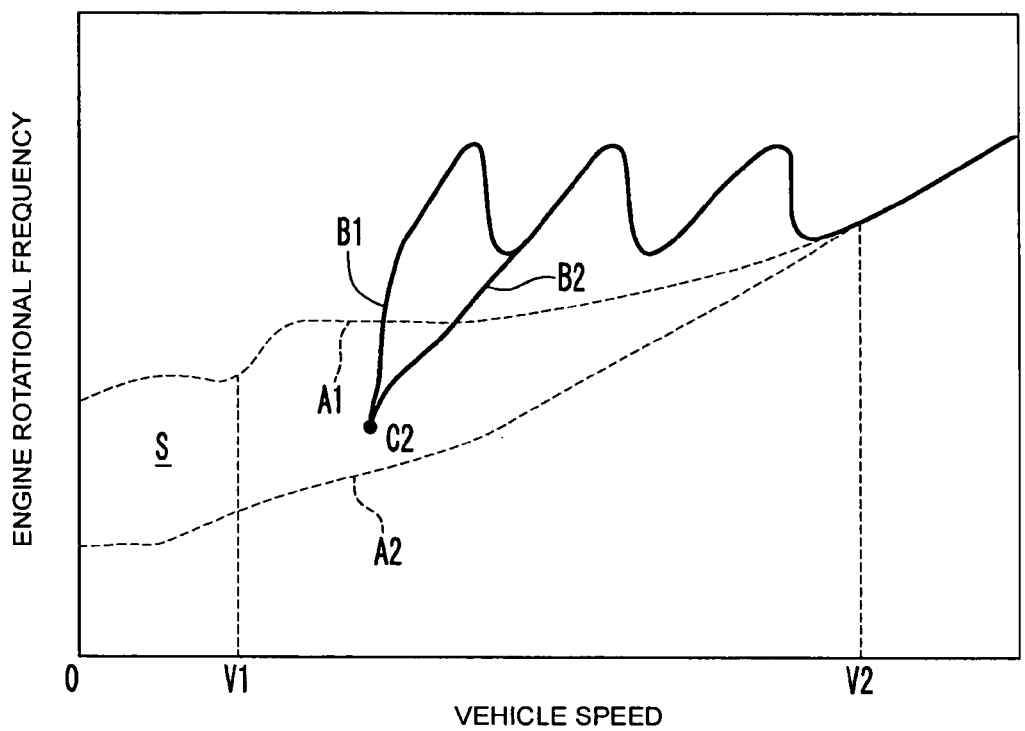
FIG. 13 is a graph illustrating a further example of a V-N characteristic curve.

In addition, according to this embodiment of the invention, an amount of or a speed of getting-out from the region S of speed change may be of course changed corresponding to a manipulated variable of the accelerator or a vehicle load. FIG. 12 is a flowchart schematically representing an example of a method for calculation of a speed change correction in STEP S4 (see FIG. 6). As shown in FIG. 12, in calculation of a speed change correction, an extent (for example, a manipulated variable of the accelerator) of a driver's intention of acceleration or deceleration is determined (STEP S41), speed change correction is set large in the case where an extent of the intention is large (see STEP S42), and conversely, a speed change correction is set small in the case where an extent of the intention is small (see STEP S43). Thereby, as shown in, for example, FIG. 13, in the case where an extent of the intention is large, the V-N characteristics of a vehicle are rapidly accelerated from a state point C2 to pass through a steep V-N characteristic curve B1 to get out of the region S of speed change. On the other hand, in the case where an extent of the intention is small, the V-N characteristics are accelerated from the state point C2 to pass through a V-N characteristic curve B2, which is gentler in inclination than the V-N characteristic curve B1, to get out of the region S of speed change. Consequently, a feeling of acceleration conformed to a driver's intention is obtained and a ride is improved.

Figure 14:
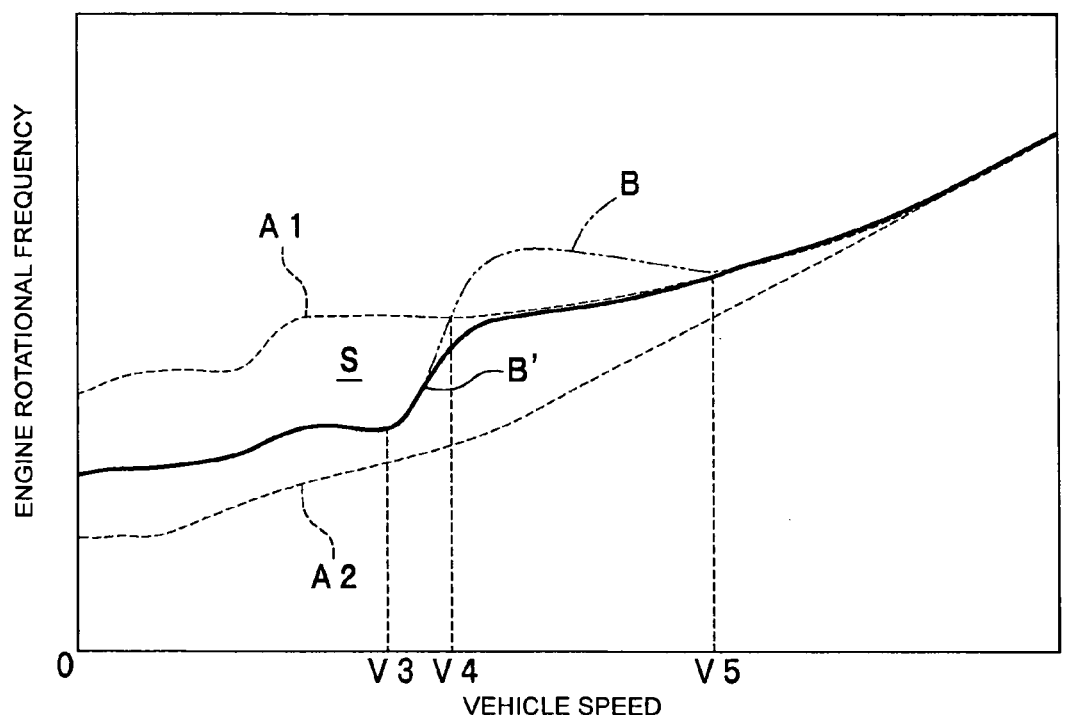
FIG. 14 is a graph illustrating a further example of a V-N characteristic curve.

In addition, FIGS. 8, 9, 10, 11, and 13 show those examples, in all of which the V-N characteristics get out of predetermined regions of speed change. However, control of speed change according to the embodiment does not necessarily have V-N characteristics getting out of the region S of speed change at all times but, for example, in the case where an intention of acceleration is small, a V-N characteristic curve B' becomes steep in inclination temporarily as shown in FIG. 14 while it is consequently possible that deviation from the region S of speed change does not occur. For example, while it is judged as a result (see STEP S2 in FIG. 6) of determination of an intention of acceleration that an intention of acceleration is large, deviation from the region S of speed change does not occur finally in some cases as a result of judging an intention of acceleration small. Also, while an intention of acceleration is judged, deviation from the region S of speed change does not occur in some cases because of a small intention of acceleration. Further, deviation from the region S of speed change does not occur in some cases because a predetermined condition (see STEP S2) is not met.

As described above, according to the embodiment, map control is usually exercised according to a speed change ratio map, which is beforehand registered, while when an accelerator opening degree and a vehicle load exceed predetermined reference ranges, a target speed change ratio is automatically corrected so that the V-N characteristics gets out of the region S of speed change. Therefore, it is possible to make positive use of a torque region of high engine performance to attain further acceleration or deceleration. Accordingly, it is possible to fully make use of an essential performance of the engine 100.

In addition, according to the embodiment, unlike the related art, deviation from the region S of speed change occurs in some cases even at the time of acceleration from a stopping state, and at the time of acceleration during traveling.

In the correction of a target speed change ratio, a driver is not required to perform a complex switching operation of a switch, etc. but can attain a desired acceleration or deceleration only through manipulation of the accelerator grip 6. Also, regulation of an accelerator opening degree makes it possible to freely select a normal map control and rapid acceleration or rapid deceleration, by which the V-N characteristics are caused to get out of the region S of speed change. Therefore, a driver can realize rapid acceleration and gentle acceleration only through manipulation of the accelerator. Also, since a complex switching operation is unnecessary, a driver can easily concentrate on driving.

Also, according to the embodiment, since there is no need for a multiplicity of operation modes, the control system is simple in construction.

According to the embodiment, after the V-N characteristics get out of the region S of speed change, a target speed change ratio is automatically reset according to a predetermined condition so that the V-N characteristics return into the region S of speed change. Therefore, operation in a state wherein the V-N characteristics are out of the region S of speed change is not continued for a long period of time. In other words, the V-N characteristics are out of the region S of speed change only during a predetermined period of time.

According to the embodiment, since the V-N characteristics automatically return into the region S of speed change, there does not occur a situation, in which a driver forgets returning, unlike the related art, in which an operation mode is switched by means of an operation switch, etc. Accordingly, an operation in a state, in which an engine rotational frequency is higher than normal after a predetermined acceleration is attained, can be prevented from continuing over a long period of time.

According to the embodiment, while the V-N characteristics are allowed to get out of the region S of speed change, an upper limit value and a lower limit value are beforehand set for a target speed change ratio to set that range of an effective speed change, which does not cause engine stall and engine over rev. When a target speed change ratio is corrected, a target speed change ratio is made not to exceed an upper limit value and a lower limit value. Accordingly, it is possible to prevent excessive acceleration or deceleration while allowing the V-N characteristics to get out of the region S of speed change.

Figure 6:
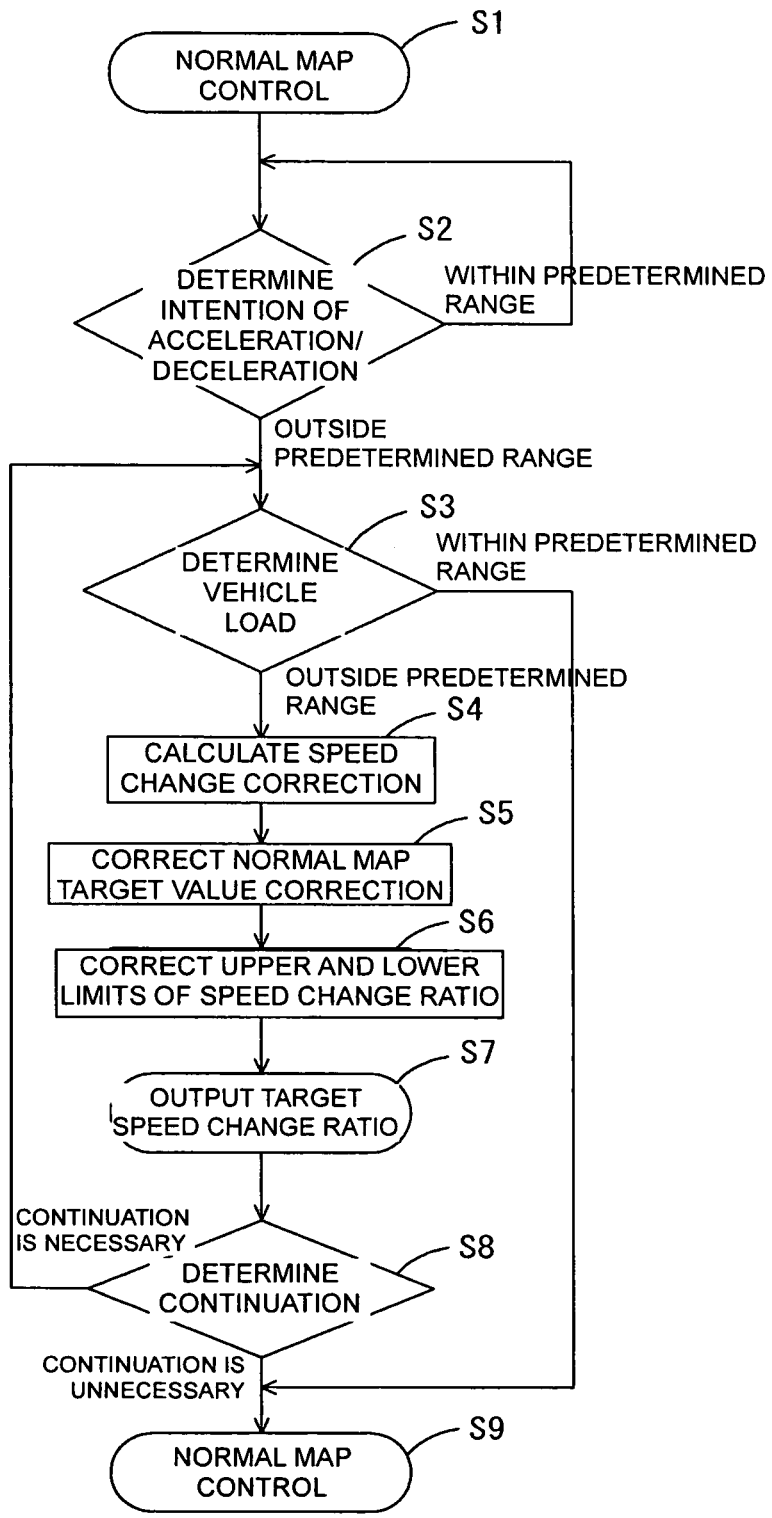
FIG. 6 is a control flowchart of the continuously variable transmission.

In addition, according to the embodiment, it is determined on the basis of both an accelerator opening degree and a vehicle load whether a target speed change ratio should be corrected (see STEP S2 and STEP S3 in FIG. 6). However, it may be determined on the basis of an accelerator opening degree or a vehicle load whether a target speed change ratio should be corrected.

Also, it may be determined on the basis of an accelerator speed or a vehicle load whether a target speed change ratio should be corrected. Further, it may be determined on the basis of an accelerator speed whether a target speed change ratio should be corrected. For example, when an accelerator speed becomes equal to or larger than a predetermined speed, a target speed change ratio may be corrected. Also, a target speed change ratio may be corrected on the basis of both an accelerator opening degree and an accelerator speed. For example, in the case where an accelerator opening degree is equal to or larger than a predetermined amount and an accelerator speed is equal to or larger than a predetermined speed, a target speed change ratio may be corrected.

As shown in FIG. 6, when a predetermined condition (see STEP S2 and STEP S3) stands, control of speed change according to the embodiment calculates a speed change correction (see STEP S4) and corrects a standard speed change ratio to find a target speed change ratio. However, a method of setting a target speed change ratio so that V-N characteristics get out of the region S of speed change is not limited to the method according to the embodiment. For example, one or two or more normal maps (maps set so that V-N characteristics do not get out of the region S of speed change) and one or two or more special maps (maps set so that V-N characteristics get out of the region S of speed change) may be stored, a map in use may be shifted to a special map from a normal map when a predetermined condition stands, and the special map may be automatically returned to the normal map when a predetermined condition of returning is established (automatic shifting of map). In addition, the special maps are strictly ones, which have V-N characteristics getting out of the region S of speed change, and not ones used in a normal range of control of speed change. Therefore, the special maps are different in quality from the normal maps.

According to the embodiment, a vehicle with a controller of the continuously variable transmission 11 mounted thereon is a motorcycle 1. In addition, motorcycles referred to herein include a motorbicycle, a scooter, etc. However, a vehicle with the controller mounted thereon is not limited to the motorcycle 1. For example, the vehicle may comprise ATV such as four-wheel buggy or the like.

An accelerator manipulating element, which is manipulated by hand, is not limited to an accelerator grip but may comprise other manipulating elements such as accelerator lever, or the like.

According to the embodiment, a speed change ratio map is used as speed change ratio information in speed change control. However, speed change ratio information referred to in speed change control is not limited to map type information. For speed change ratio information, it is possible to make use of tabled information, information in the form of a function, other optional data construction, etc.

As described above, the invention is useful for a vehicle (for example, a motorcycle, etc.) provided with an accelerator manipulating element, which is manipulated by hand, and a controller of a continuously variable transmission mounted on the vehicle.

The particular embodiments of the invention described in this document should be considered illustrative, rather than restrictive. Modification to the described embodiments may be made without departing from the spirit of the invention as defined by the following claims.

The invention claimed is:

1. A controller of a continuously variable transmission (CVT) mounted on a vehicle, which includes an engine and an accelerator manipulating element manipulated by hand to control an accelerator, the controller including
    an accelerator manipulated variable detector that detects a manipulated variable of the accelerator manipulating element, and
    a speed change ratio controller that sets a target speed change ratio of the CVT on the basis of the manipulated variable of the accelerator manipulating element and controls the CVT so that a current speed change ratio, that the CVT reaches, becomes the target speed change ratio, and
    wherein the speed change ratio controller comprises
    a standard speed change ratio setting unit that sets a standard speed change ratio, according to a normal map, as the target speed change ratio so that V-N (vehicle speed-engine rotational frequency) characteristics prescribed by a vehicle speed and an engine rotational frequency fall in a predetermined region of speed change that has a top limit defined by V-N characteristics determined when the accelerator is fully opened to accelerate under a condition of a normal load and a lower limit defined by V-N characteristics determined when the accelerator is fully closed to decelerate under the condition of the normal load, when the manipulated variable of the accelerator manipulating element is in a predetermined standard range, the normal map being set so that the V-N characteristics do not get out of the predetermined region of speed change,
    a specific speed change ratio setting unit that corrects the standard speed change ratio and sets a corrected speed change ratio, which is outside the normal map, as the target speed change ratio so that the V-N characteristics get out of the predetermined region of speed change and the current speed change ratio, that the CVT reaches, becomes the target speed change ratio that gets the V-N characteristics out of the predetermined region of speed change so that the target speed change ratio is set without being restricted by the predetermined region of speed change, when the manipulated variable of the accelerator manipulating element exceeds the standard range, and
    an automatic return unit that, when the V-N characteristics get out of the predetermined region of speed change, resets the target speed change ratio so that the V-N characteristics having gotten out of the predetermined region of speed change return to the predetermined region of speed change and the current speed change ratio, that the CVT reaches, becomes the target speed change ratio that returns the V-N characteristics to the predetermined region of speed change.

2. The controller of claim 1, further comprising
    a load detector that detects a load on the vehicle, and wherein
    the speed change ratio controller sets the target speed change ratio of the continuously variable transmission on the basis of the manipulated variable of the accelerator manipulating element and the load on the vehicle, and
    the standard speed change ratio setting unit sets the target speed change ratio so that the V-N characteristics prescribed by the vehicle speed and the engine rotational frequency falls in the predetermined region of speed change, when the load on the vehicle is in a bad predetermined standard range,
    the specific speed change ratio setting unit sets the target speed change ratio so that the V-N characteristics get out of the predetermined region of speed change, when the load on the vehicle exceeds the bad standard range.

3. The controller of a CVT, according to claim 2, wherein the speed change ratio controller comprises a storage unit, which stores predetermined speed change ratio information,
    the standard speed change ratio setting unit sets the target speed change ratio according to the speed change ratio information, and
    the specific speed change ratio setting unit calculates a correction for the target speed change ratio, which is set by the standard speed change ratio setting unit, on the basis of the load on the vehicle and sets a value, which is obtained by correcting the target speed change ratio on the basis of the correction, as a new target speed change ratio when the load on the vehicle exceeds the standard range.

4. The controller of a CVT, according to claim 2, wherein the speed change ratio controller comprises a storage unit, which stores predetermined speed change ratio information,
    the standard speed change ratio setting unit sets the target speed change ratio according to the speed change ratio information, and
    the specific speed change ratio setting unit calculates a correction for the target speed change ratio, which is set by the standard speed change ratio setting unit, on the basis of the manipulated variable of the accelerator manipulating element and the load on the vehicle and sets a value, which is obtained by correcting the target speed change ratio on the basis of the correction, as a new target speed change ratio when the manipulated variable of the accelerator manipulating element and the load on the vehicle exceed the standard ranges.

5. The controller of a CVT, according to claim 2, wherein the continuously variable transmission comprises a primary sheave, a secondary sheave, and a transmission belt wound around the primary sheave and the secondary sheave, and
  further comprising a vehicle speed detector that detects a travel speed of the vehicle,
  an engine rotational frequency detector that detects the engine rotational frequency which is that of the engine, and
  a secondary sheave rotational frequency detector that detects a rotational frequency of the secondary sheave, and
  wherein the speed change ratio controller comprises a storage unit, which stores predetermined speed change ratio information,
  the standard speed change ratio setting unit sets the target speed change ratio according to the speed change ratio information on the basis of the manipulated variable of the accelerator manipulating element and the travel speed, and
  the specific speed change ratio setting unit calculates a correction for the target speed change ratio, which is set by the standard speed change ratio setting unit, on the basis of the manipulated variable of the accelerator manipulating element, the travel speed, the engine rotational frequency, and the secondary sheave rotational frequency and sets a value, which is obtained by correcting the target speed change ratio on the basis of the correction, as a new target speed change ratio when the manipulated variable of the accelerator manipulating element and the load on the vehicle exceed the standard ranges.

6. The controller of a CVT, according to claim 1, wherein the speed change ratio controller comprises a storage unit, which stores predetermined speed change ratio information,
  the standard speed change ratio setting unit sets the target speed change ratio according to the speed change ratio information, and
  the specific speed change ratio setting unit calculates a correction for the target speed change ratio, which is set by the standard speed change ratio setting unit, on the basis of the manipulated variable of the accelerator manipulating element and sets a value, which is obtained by correcting the target speed change ratio on the basis of the correction, as a new target speed change ratio when the manipulated variable of the accelerator manipulating element exceeds the standard range.

7. The controller of a CVT, according to claim 1, wherein the automatic return unit begins resetting of the target speed change ratio when the manipulated variable of the accelerator manipulating element becomes equal to or less than a predetermined amount after the vehicle accelerates and the V-N characteristics get out of the predetermined region of speed change.

8. The controller of a CVT, according to claim 1, wherein the automatic return unit begins resetting of the target speed change ratio when a decrease in the manipulated variable of the accelerator manipulating element becomes equal to or more than a predetermined amount after the vehicle accelerates and the V-N characteristics get out of the predetermined region of speed change.

9. The controller of a CVT, according to claim 1, wherein the automatic return unit begins resetting of the target speed change ratio when the manipulated variable of the accelerator manipulating element becomes equal to or more than a predetermined amount after the vehicle decelerates and the V-N characteristics get out of the predetermined region of speed change.

10. The controller of a CVT, according to claim 1, wherein the automatic return unit begins resetting of the target speed change ratio when an increase in the manipulated variable of the accelerator manipulating element becomes equal to or more than a predetermined amount after the vehicle decelerates and the V-N characteristics get out of the predetermined region of speed change.

11. The controller of a CVT, according to claim 1, further comprising an acceleration detector that detects acceleration of the vehicle, and
  wherein the automatic return unit begins resetting of the target speed change ratio when the acceleration becomes equal to or less than a predetermined value due to a driver's manipulation after
  the vehicle accelerates and
  the V-N characteristics get out of the predetermined region of speed change.

12. The controller of a CVT, according to claim 1, further comprising an acceleration detector that detects acceleration of the vehicle, and
  wherein the automatic return unit begins resetting of the target speed change ratio when a decrease in the acceleration becomes equal to or more than a predetermined amount due to a driver's manipulation after the vehicle accelerates and the V-N characteristics get out of the predetermined region of speed change.

13. The controller of a CVT, according to claim 1, further comprising an acceleration detector that detects acceleration of the vehicle, and
  wherein the automatic return unit begins resetting of the target speed change ratio when the acceleration becomes equal to or more than a predetermined value after the vehicle accelerates and the V-N characteristics get out of the predetermined region of speed change.

14. The controller of a CVT, according to claim 1, further comprising a vehicle speed detector that detects a travel speed of the vehicle, and
  wherein the automatic return unit begins resetting of the target speed change ratio when the travel speed becomes equal to or less than a predetermined value due to a driver's manipulation after
  the vehicle accelerates and
  the V-N characteristics get out of the predetermined region of speed change.

15. The controller of a CVT, according to claim 1, further comprising a vehicle speed detector that detects a travel speed of the vehicle, and
  wherein the automatic return unit begins resetting of the target speed change ratio when a decrease in the travel speed becomes equal to or more than a predetermined value due to a driver's manipulation after the vehicle accelerates and the V-N characteristics get out of the predetermined region of speed change.

16. The controller of a CVT, according to claim 1, further comprising a vehicle speed detector that detects a travel speed of the vehicle, and
  wherein the automatic return unit begins resetting of the target speed change ratio when the travel speed becomes equal to or more than a predetermined value after the vehicle accelerates and the V-N characteristics get out of the predetermined region of speed change.

17. The controller of a CVT, according to claim 1, further comprising a vehicle speed detector that detects a travel speed of the vehicle, and
  wherein the automatic return unit begins resetting of the target speed change ratio when the travel speed becomes equal to or more than a predetermined value due to a driver's manipulation after the vehicle decelerates and the V-N characteristics get out of the predetermined region of speed change.

18. The controller of a CVT, according to claim 1, further comprising a vehicle speed detector that detects a travel speed of the vehicle, and
wherein the automatic return unit begins resetting of the target speed change ratio when an increase in the travel speed becomes equal to or more than a predetermined amount due to a driver's manipulation after the vehicle decelerates and the V-N characteristics get out of the predetermined region of speed change.

19. The controller of a CVT, according to claim 1, further comprising a vehicle speed detector that detects a travel speed of the vehicle, and
wherein the automatic return unit begins resetting of the target speed change ratio when the travel speed becomes equal to or less than a predetermined value after the vehicle decelerates and the V-N characteristics get out of the region of speed change.

20. The controller of a CVT, according to claim 1, further comprising an engine rotational frequency detector that detects the engine rotational frequency which is that of the engine, and
wherein the automatic return unit begins resetting of the target speed change ratio when the engine rotational frequency becomes equal to or less than a predetermined value due to a driver's manipulation after the vehicle accelerates or decelerates and the V-N characteristics get out of the predetermined region of speed change.

21. The controller of a CVT, according to claim 1, further comprising an engine rotational frequency detector that detects the engine rotational frequency which is that of the engine, and
wherein the automatic return unit begins resetting of the target speed change ratio when a decrease in the engine rotational frequency becomes equal to or more than a predetermined amount due to a driver's manipulation after the vehicle accelerates or decelerates and the V-N characteristics get out of the predetermined region of speed change.

22. The controller of a CVT, according to claim 1, further comprising an engine rotational frequency detector that detects the engine rotational frequency which is that of the engine, and
wherein the automatic return unit begins resetting of the target speed change ratio when the engine rotational frequency becomes equal to or more than a predetermined value after the vehicle accelerates or decelerates and the V-N characteristics get out of the predetermined region of speed change.

23. The controller of a CVT, according to claim 1, further comprising a timer capable of measuring an elapsed time, and
wherein the automatic return unit begins resetting of the target speed change ratio when a predetermined time elapses after the V-N characteristics get out of the predetermined region of speed change.

24. The controller of a CVT, according to claim 1, wherein when the manipulated variable of the accelerator manipulating element becomes equal to or more than a predetermined amount, the specific speed change ratio setting unit sets the target speed change ratio so that the V-N characteristics get out of the predetermined region of speed change.

25. The controller of a CVT, according to claim 1, wherein when a load on a vehicle becomes equal to or more than a predetermined value in a state, in which a vehicle travels, the specific speed change ratio setting unit sets the target speed change ratio so that the V-N characteristics get out of the predetermined region of speed change.

26. The controller of claim 1, wherein the automatic return unit determines whether the target speed change ratio needs to be continuously out of the predetermined region of speed change or not, and, if not, the automatic return unit resets the target speed change ratio so that the V-N characteristics return to the predetermined region of speed change.

27. The controller of claim 1, wherein the specific speed change ratio setting unit determines whether the target speed change ratio falls in a range of an effective speed change ratio which does not cause engine stall or engine over rev, and
if the specific speed change ratio setting unit determines that the target speed change ratio falls in the range of the effective speed change ratio, the specific speed change ratio setting unit sets the target speed change ratio as a new target speed change ratio, or
if the specific speed change ratio setting unit determines that the target speed change ratio falls in a range that may cause engine stall or engine over rev, the specific speed change ratio setting unit sets a preset upper limit or lower limit as the new target speed change ratio.

28. A vehicle comprising an engine and an accelerator manipulating element, and provided with the controller of a CVT, according to claim 1.

* * * * *